United States Patent
Sonoda et al.

(10) Patent No.: US 7,937,540 B2
(45) Date of Patent: May 3, 2011

(54) STORAGE-ACCESS CONTROL SYSTEM FOR PREVENTING UNAUTHORIZED ACCESS TO A STORAGE DEVICE

(75) Inventors: Toshihiro Sonoda, Kawasaki (JP); Shigehiro Idani, Kawasaki (JP); Tomoyoshi Takebayashi, Kawasaki (JP); Akihiro Inomata, Kawasaki (JP); Gakuto Ozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 22 days.

(21) Appl. No.: 11/447,137

(22) Filed: Jun. 6, 2006

(65) Prior Publication Data

US 2007/0214332 A1 Sep. 13, 2007

(30) Foreign Application Priority Data

Mar. 7, 2006 (JP) ................................ 2006-061627

(51) Int. Cl.
*G06F 12/00* (2006.01)
*G06F 13/00* (2006.01)
*G06F 13/28* (2006.01)

(52) U.S. Cl. ...................................... 711/154
(58) Field of Classification Search .................. 711/154
See application file for complete search history.

(56) References Cited

U.S. PATENT DOCUMENTS

| | | | | |
|---|---|---|---|---|
| 7,185,192 | B1 * | 2/2007 | Kahn | 713/155 |
| 2003/0055943 | A1 * | 3/2003 | Kanai | 709/223 |
| 2004/0010701 | A1 | 1/2004 | Umebayashi et al. | |
| 2005/0033968 | A1 * | 2/2005 | Dupouy et al. | 713/183 |
| 2006/0004974 | A1 * | 1/2006 | Lin et al. | 711/164 |
| 2006/0190941 | A1 | 8/2006 | Kobayashi et al. | |
| 2006/0200681 | A1 | 9/2006 | Kato et al. | |
| 2008/0133937 | A1 | 6/2008 | Kato et al. | |

FOREIGN PATENT DOCUMENTS

| | | |
|---|---|---|
| JP | 2001-027970 | 1/2001 |
| JP | 2003-233521 | 8/2003 |
| JP | 2004-046307 | 2/2004 |
| JP | 2004-151785 | 5/2004 |
| JP | 2005-235159 | 9/2005 |
| JP | 2005-251030 | 9/2005 |
| JP | 2005-339002 | 12/2005 |
| JP | 2006-092296 | 4/2006 |

OTHER PUBLICATIONS

Tanenbaum, Structured Computer Organization, 1984, Prentice Hall, 2nd Ed, pp. 10-12.*
Silberschatz et al., Operating Systems Concepts, Jan. 1995, Addison-Wesley, 4th Edition, p. 349.*
Japanese Office Action mailed Dec. 14, 2010 for corresponding Japanese Patent Application No. 2006-061627.

* cited by examiner

*Primary Examiner* — Kevin L Ellis
*Assistant Examiner* — Chad L Davidson
(74) *Attorney, Agent, or Firm* — Staas & Halsey LLP (57) ABSTRACT

A device driver includes an access permitted directory storage unit and an access-permission determining unit. The access-permitted directory storage unit stores as an access-permitted directory an activation directory for a process that is allowed to access an S memory (private memory). The access-permission determining unit checks whether an activation directory for a process that has requested for access to the S memory matches the access-permitted directory. Based on the result, the access-permission determining unit determines whether to accept the access request.

2 Claims, 12 Drawing Sheets

STORAGE-ACCESS CONTROL SYSTEM FOR PREVENTING UNAUTHORIZED ACCESS TO A STORAGE DEVICE

BACKGROUND OF THE INVENTION

1. Field of the Invention

The present invention generally relates to a technology for controlling access to a storage device. The present invention specifically relates to a technology for preventing unauthorized access to a storage device.

2. Description of the Related Art

Universal serial bus (USB) memories have become very popular as portable storage devices because of their high capacity and high portability. The USB memories, however, have a disadvantage that they can be easily stolen, misplaced, or lost, and the information in the USB memories can be misused. Therefore, there is a need of some means for preventing leakage of information in the USB memories.

One approach is to prepare a private area in the USB memory and limit access to the private area based on user authentication so that information in the private area is prevented from leaking. Such a technique is disclosed, for example, in Japanese Patent Application Laid-Open No. 2004-151785. In this approach, however, when a user is determined to be authenticated, the private area becomes accessible to all the process, authorized and unauthorized. An unauthorized process may access the information in the private area and misuse the information. For example, when the USB memory is connected to a third-party computer or a computer that has not been virus-checked, an unauthorized process running in such a computer may access information in the private area and misuse the information. Thus, there is a need of a technology for preventing access to the USB memories by unauthorized processes.

SUMMARY OF THE INVENTION

It is an object of the present invention to at least partially solve the problems in the conventional technology.

According to one aspect of the present invention, a method of controlling access to a recording medium from a process based on a device driver program includes receiving a request for access to the recording medium from the process; determining, in response to received access request, whether to allow access to the recording medium based on information about the process; and allowing the process to access the recording medium upon it is determined at the determining to allow access to the recording medium.

According to another aspect of the present invention, a storage-access control system includes a computer and a computer-readable portable recording medium connectable to the computer. The recording medium stores therein a device driver program to control access thereto, which is loaded as a device driver into the computer. The device driver includes a receiving unit that receives a request for access to the recording medium from a process; a determining unit that determines, in response to received access request, whether to allow access to the recording medium based on information about the process; and an allowing unit that allows access to the recording medium upon the determining unit determining to allow access to the recording medium.

According to still another aspect of the present invention, a computer-readable recording medium stores therein a computer program that causes a computer to implement the above method.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained below in detail with reference to the accompanying drawings.

Figure 1:
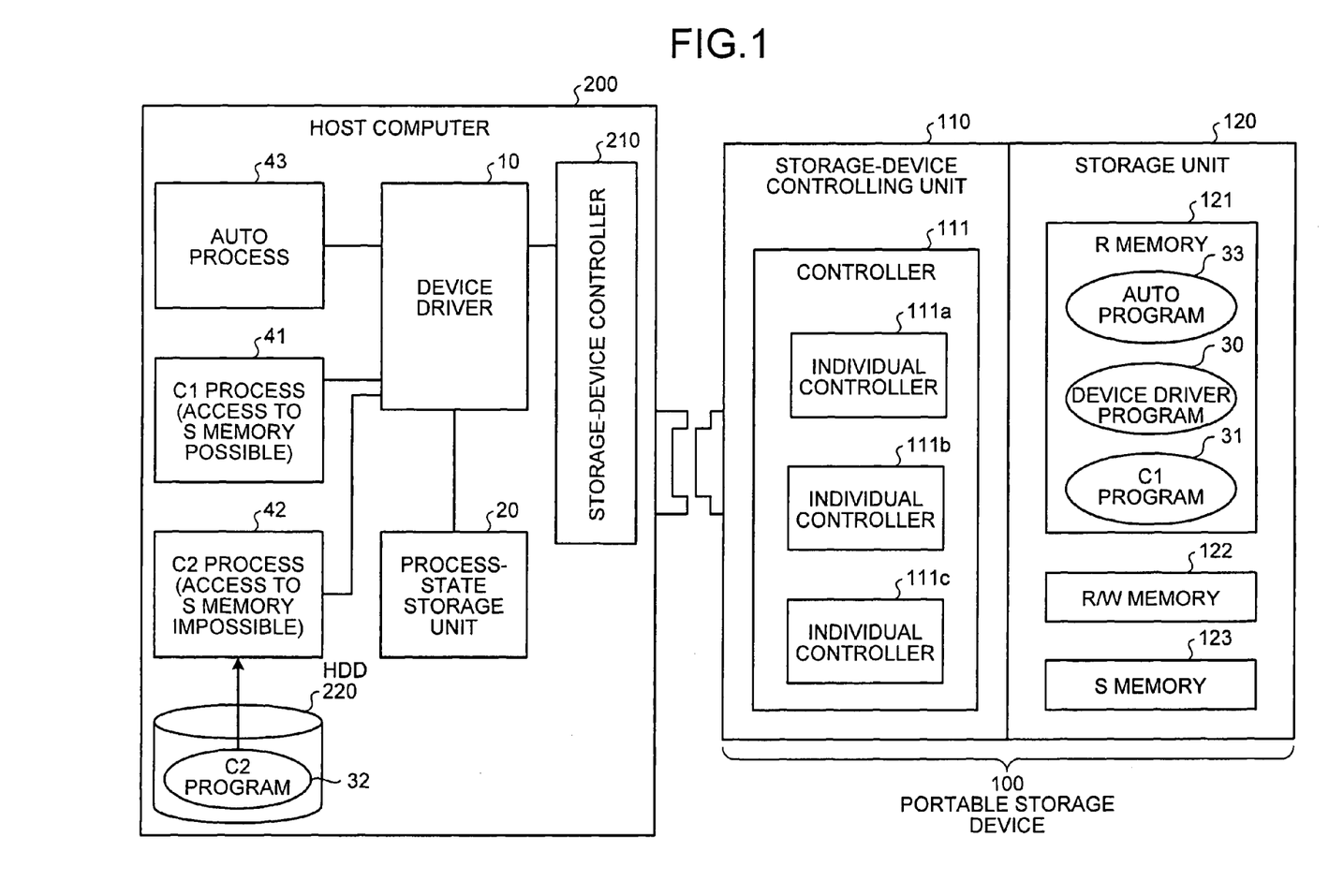
FIG. 1 is a functional block diagram of a portable-storage-device access system according to a first embodiment of the present invention.

FIG. 1 is a functional block diagram of a portable-storage-device access system according to a first embodiment of the present invention. Incidentally, the first embodiment relates to access control of a private area in a portable memory. The portable-storage-device access system includes a portable storage device 100, and a host computer 200 to which the portable storage device 100 can be detachably connected. When connecting the portable storage device 100 to the host computer 200, the portable storage device 100 is inserted into a dedicated slot provided in the host computer 200, or can be connected via a dedicated cable.

The portable storage device 100 can be any high-capacity small-sized memory such as a USB memory. The portable storage device 100 includes a storage-device controlling unit 110 and a storage unit 120.

The storage-device controlling unit 110 controls communication with the host computer 200. The storage-device controlling unit 110 includes a controller 111 that further includes three individual controllers 111a to 111c. The controller 111 serves as a USB hub. The storage unit 120 stores therein data, and includes an R memory 121, an R/W memory 122, and an S memory 123.

The controller 111a controls access to the R memory 121. The controller 111b controls access to the R/W memory 122. The controller 111c controls access to the S memory 123.

The R memory 121 is a read only memory (ROM). The R memory 121 stores therein an auto program 33, a device driver program 30, a C1 program 31 executed by the host computer 200, and read-only data. The auto program 33 is automatically invoked when the portable storage device 100 is connected to the host computer 200. The device driver program 30 is a driver for the portable storage device 100. The C1 program 31 is a computer program to access the S memory 123. A user can freely write data to and read data from the R/W memory 122. The S memory 123 is a private memory for storing therein data that is confidential and not to be disclosed to any third party, and provides a storage area to which access is controlled and limited.

The host computer 200 is a personal computer that includes a storage-device controller 210 and a hard disk drive (HDD) 220. The host computer 200 executes a device driver 10, a C1 process 41, a C2 process 42, an auto process 43 and the like. The host computer 200 further includes a process-state storage unit 20 on the operating system to store information such as an activation directory. Incidentally, the term "activation directory" as used herein refers to a directory that contains a computer program for a process to execute.

The storage-device controller 210 controls the portable storage device 100. The HDD 220 stores therein various computer programs and data. The HDD 220 stores a C2 program 32.

The device driver 10 controls the storage-device controller 210 to control access to the portable storage device 100. The device driver 10 is the device driver program 30 stored in the portable storage device 100, which is loaded into the host computer 200. The C1 process 41 requests the device driver 10 for access to the S memory 123. The C1 process 41 is performed by the execution of the C1 program 31 stored in the portable storage device 100. The C2 process 42 makes a request to the device driver 10 in an attempt to access the S memory 123. The C2 process 42 is performed by the execution of the C2 program 32 stored in the HDD 220. The device driver 10 allows access to the S memory 123 for the C1 process 41 activated from the portable storage device 100. On the other hand, the device driver 10 denies access to the S memory 123 for the C2 process 42 activated from the HDD 220.

The auto process 43 is automatically executed when the portable storage device 100 is connected to the host computer 200. The auto process 43 is performed by the execution of the auto program 33 stored in the portable storage device 100. In the auto process 43, the device driver program 30 is read from the portable storage device 100 and loaded as the device driver 10 into the host computer 200. The auto process 43 informs the device driver 10 of the drive code of the portable storage device 100.

Figure 2:
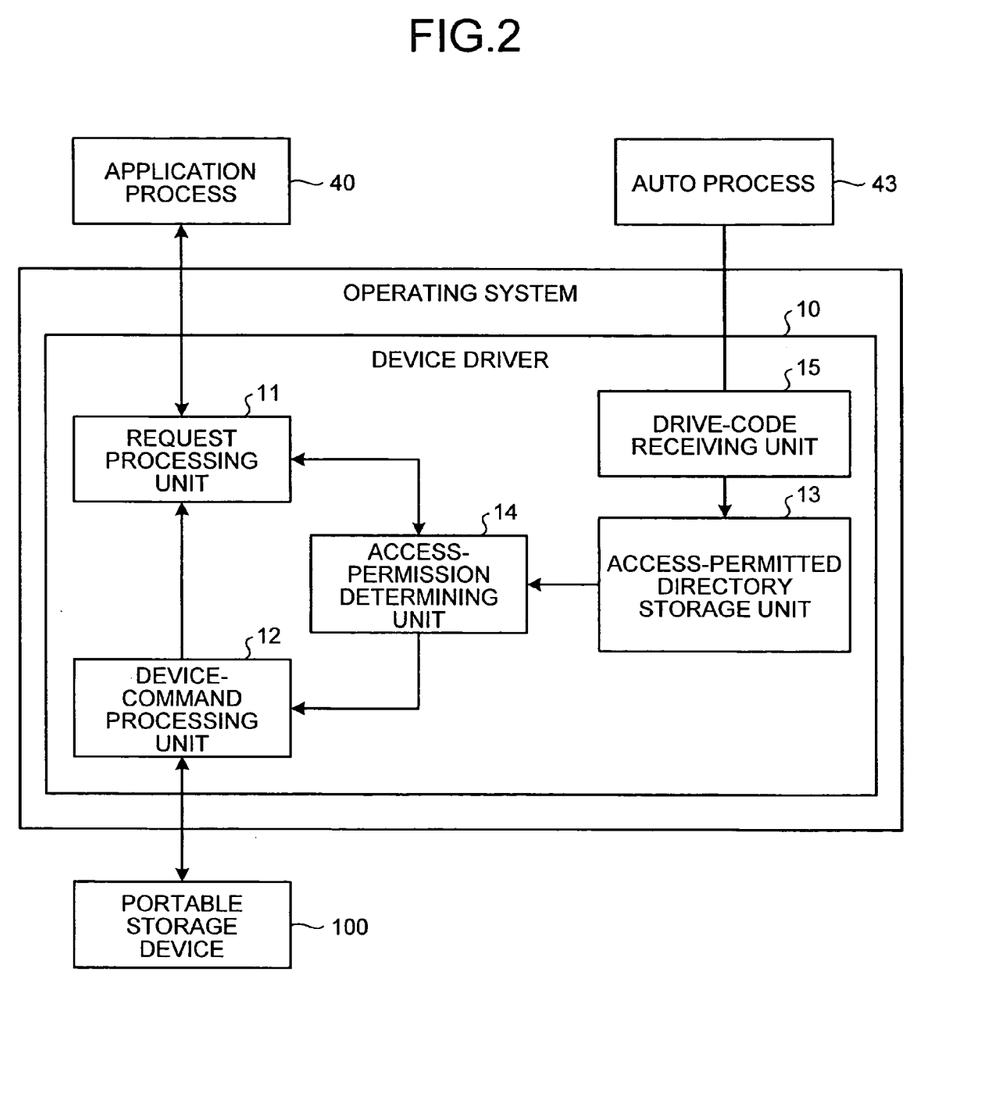
FIG. 2 is a detailed functional block diagram of a device driver shown in FIG. 1.

FIG. 2 is a detailed functional block diagram of the device driver 10. The device driver 10 includes a request processing unit 11, a device-command processing unit 12, an access-permitted directory storage unit 13, an access-permission determining unit 14, and a drive-code receiving unit 15.

The request processing unit 11 receives a request for access to the portable storage device 100 from an application process 40 executed on the host computer 200. The request processing unit 11 sends the received access request to the access-permission determining unit 14. Besides, the request processing unit 11 returns the result of the access request to the application process 40. When the access-permission determining unit 14 rejects the access request, the request processing unit 11 notifies the application process 40 of the access denial without accessing the portable storage device 100.

The device-command processing unit 12 gains access to the portable storage device 100 in response to the access request received through the request processing unit 11. The device-command processing unit 12 sends the result of the access request to the request processing unit 11.

The access-permitted directory storage unit 13 stores an activation directory for a process that is allowed to access the S memory 123, i.e., a directory that contains the C1 program 31 in the portable storage device 100, and the drive code of the portable storage device 100. For example, when the C1 program 31 is contained in a directory "/APPLICATIONS" in the portable storage device 100 and the drive code of the portable storage device 100 is E, the access-permitted directory storage unit 13 stores "E:\APPLICATIONS" as an access-permitted directory. Similarly, if a process that is performed by the execution of a computer program contained in a directory "\APPLICATIONS\C" in the portable storage device 100 is allowed to access the S memory 123, the access-permitted directory storage unit 13 stores "E:\APPLICATIONS\C" as an access-permitted directory.

The access-permission determining unit 14 determines whether to accept the access request received from the request processing unit 11 using the access-permitted directory storage unit 13 and the process-state storage unit 20. More specifically, the access-permission determining unit 14 checks whether the access-permitted directory storage unit 13 stores a directory that matches an activation directory for a process, which has requested for access to the S memory 123. Accordingly, the access-permission determining unit 14 determines whether to accept the access request for the S memory 123.

Having determined to accept the access request for the S memory 123, the access-permission determining unit 14 sends the access request to the device-command processing unit 12. Having determined to reject the access request, the access-permission determining unit 14 informs the request processing unit 11 of this result. The access-permission determining unit 14 sends the device-command processing unit 12 other access requests than the one for the S memory 123 without conditions. That is, on receipt of an access request for the S memory 123, the access-permission determining unit 14 determines whether to accept the access request. Only when the access request is acceptable, the access-permission determining unit 14 sends the access request to the device-command processing unit 12. Thus, an unauthorized process cannot access the S memory 123.

The drive-code receiving unit 15 receives the drive code of the portable storage device 100 from the auto process 43. The drive-code receiving unit 15 stores the received drive code in the access-permitted directory storage unit 13. This means that, when the device driver 10 is stored in the R memory 121 as the device driver program 30, the access-permitted directory storage unit 13 stores only a directory that contains a computer program for a process allowed to access the S memory 123. After the device driver program 30 is loaded as the device driver 10 into the host computer 200, the access-permitted directory storage unit 13 stores therein the drive code of the portable storage device 100.

Figure 3:
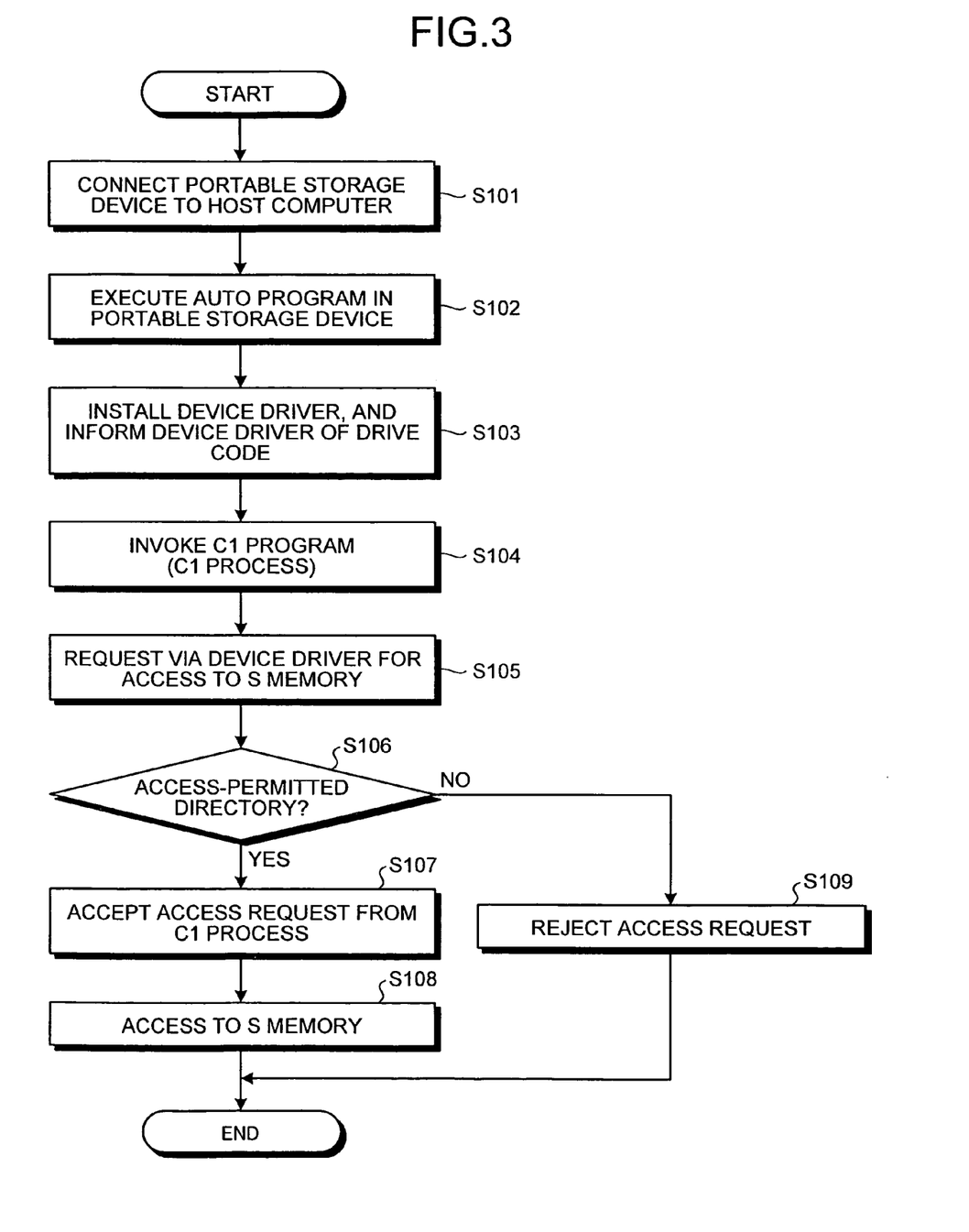
FIG. 3 is a flowchart for explaining the process of accessing a memory shown in FIG. 1.

FIG. 3 is a flowchart for explaining the process of accessing the S memory 123. Referring to FIG. 3, when the portable storage device 100 is connected to the host computer 200 (step S101), the host computer 200 executes the auto program 33 in the portable storage device 100 (step S102). The auto process 43 reads the device driver program 30 from the portable storage device 100, and loads the device driver program 30 as the device driver 10 into the host computer 200. Then, the auto process 43 informs the device driver 10 of the drive code of the portable storage device 100 (step S103).

Figure 4:
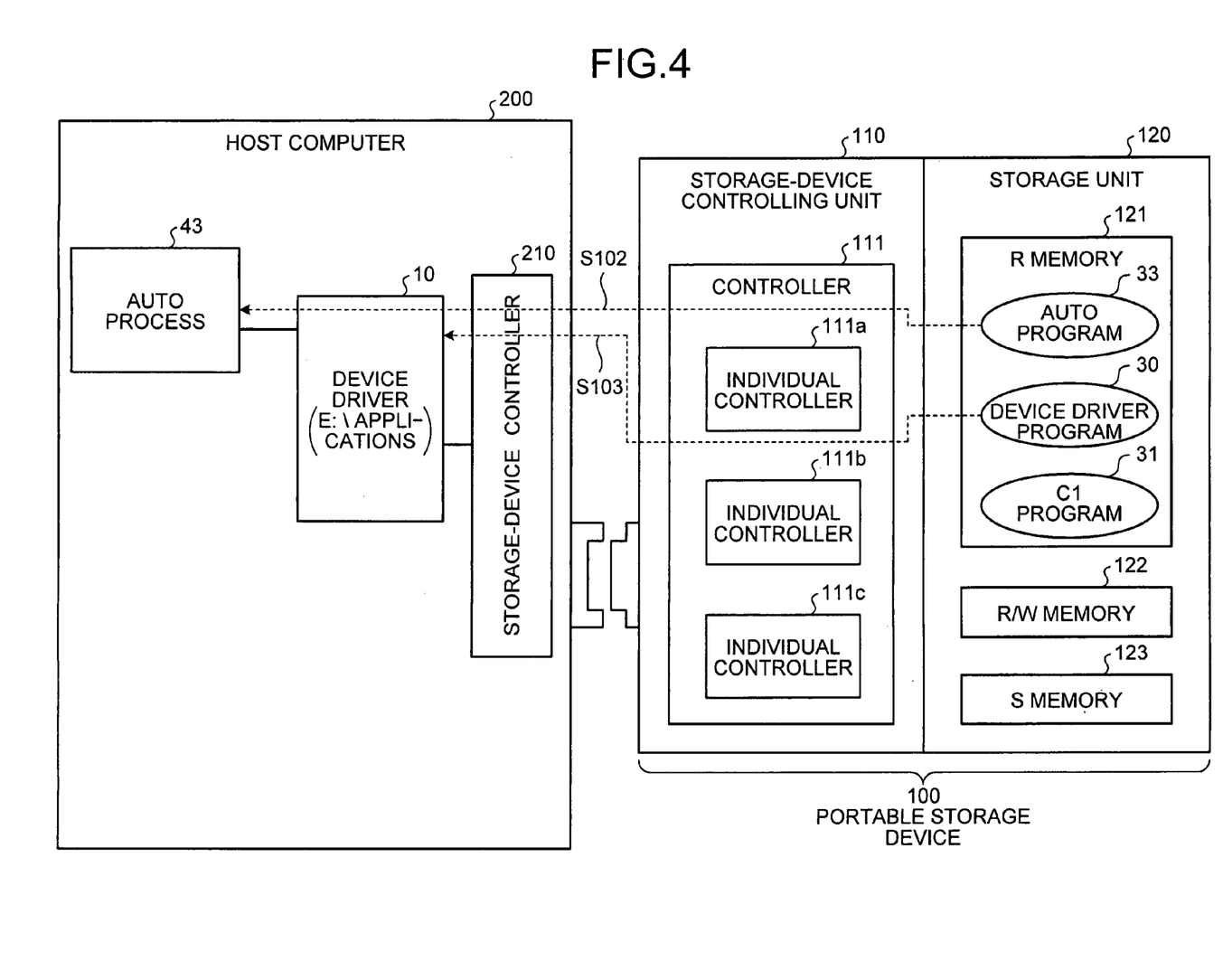
FIG. 4 is a schematic for explaining initial operation.

FIG. 4 is a schematic for explaining the initial operation of the host computer 200 up to step S103. As shown in FIG. 3, the device driver 10 stores "E:\APPLICATIONS" in the access-permitted directory storage unit 13 as an access-permitted directory. That is, the auto process 43 informs the device driver 10 of the drive code E of the portable storage device 100, and a directory "\APPLICATIONS" contains the C1 program 31.

Figure 5:
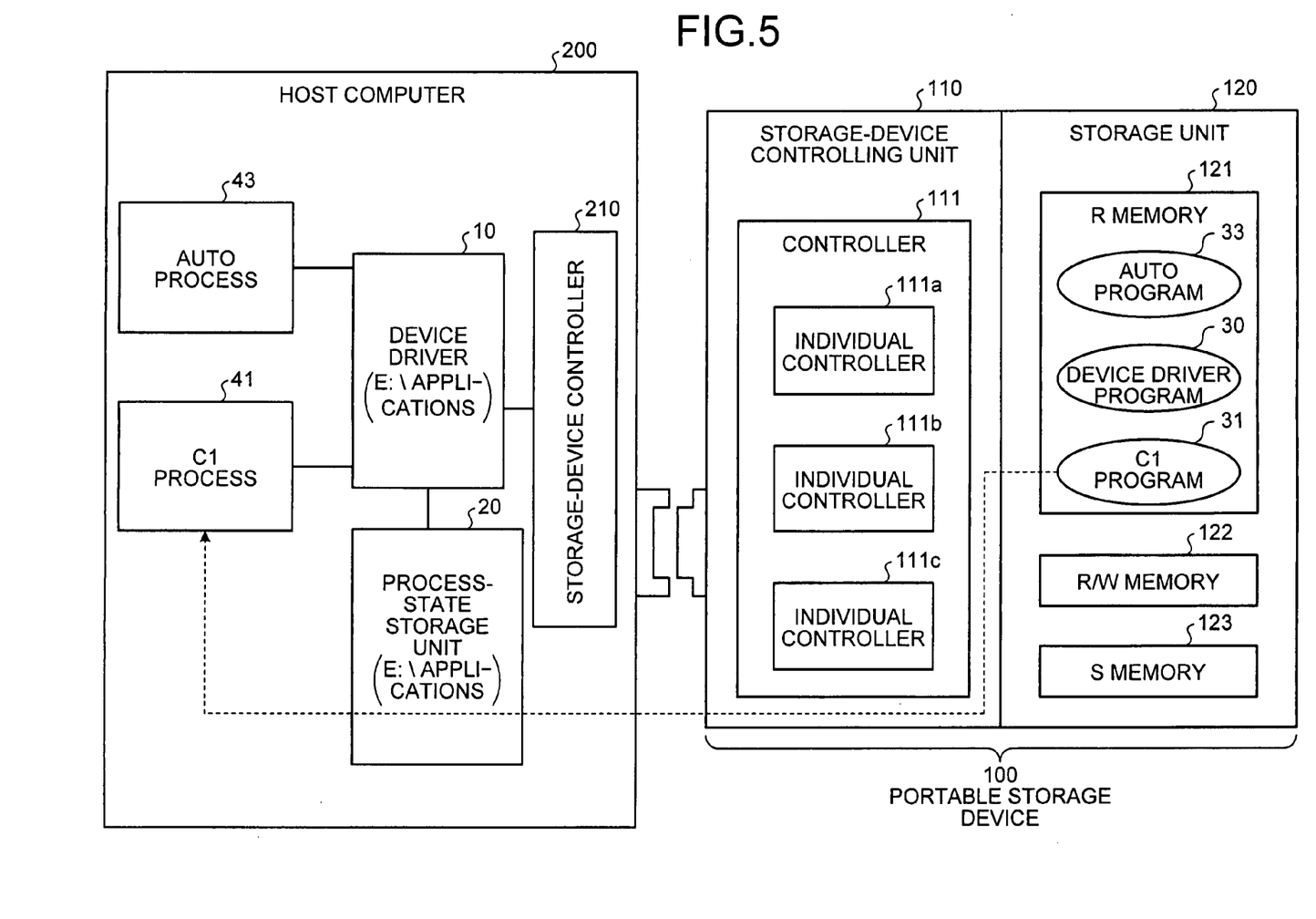
FIG. 5 is a schematic for explaining the activation of a C1 process and an access request sent to the device driver.

When the user invokes the C1 program 31 to access the S memory 123 (step S104), the C1 process 41 makes a request via the device driver 10 for access to the S memory 123 (step S105). FIG. 5 is a schematic for explaining the activation of the C1 process 41 and an access request sent to the device driver 10. The C1 process 41 is performed by the execution of the C1 program 31, and requests the device driver 10 for access to the S memory 123.

Figure 6:
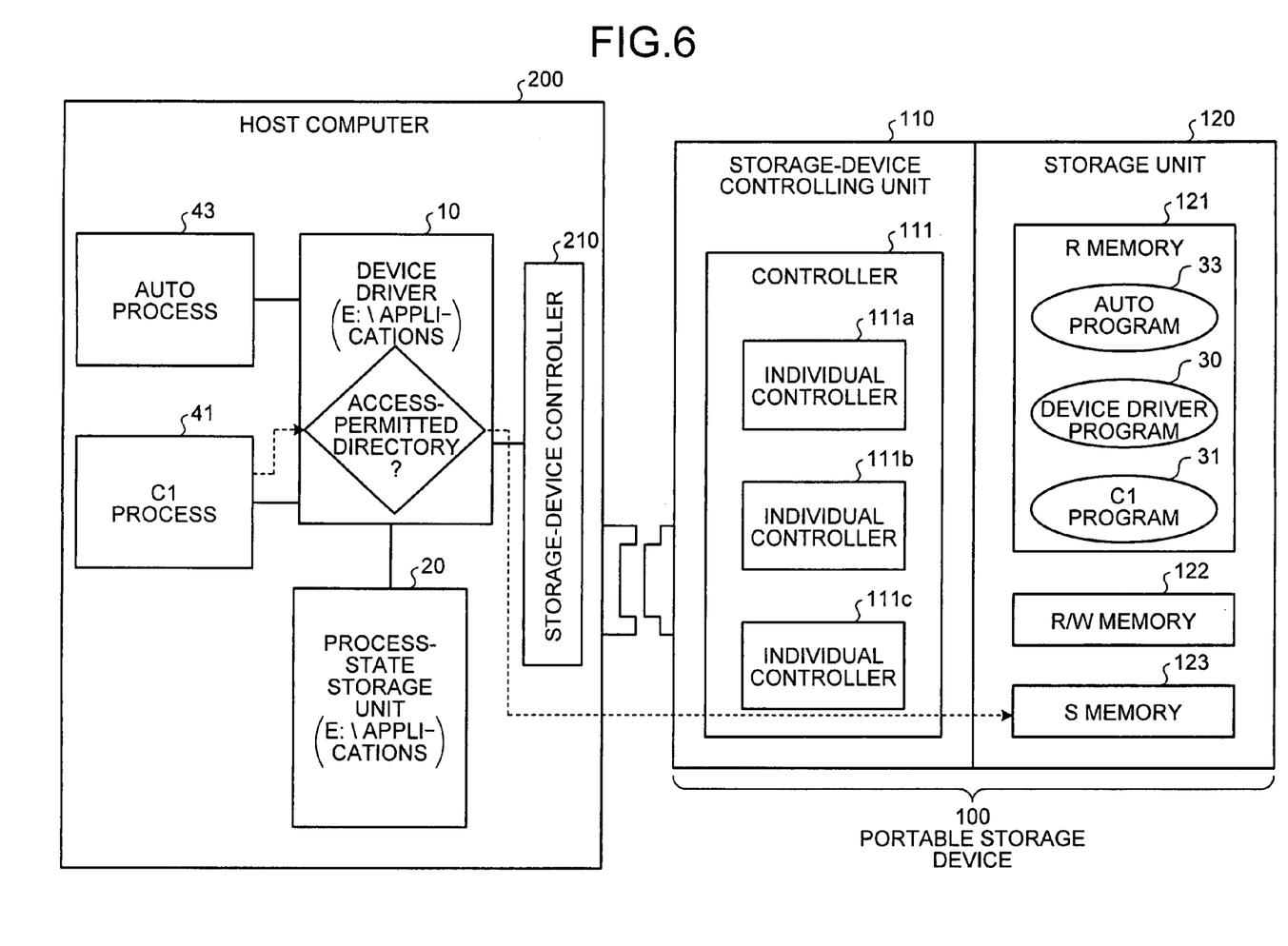
FIG. 6 is a schematic for explaining permission for access to an S memory shown in FIG. 1.

FIG. 6 is a schematic for explaining permission for access to the S memory 123. The access-permission determining unit 14 of the device driver 10 determines whether an activation directory for the C1 process 41 matches the access-permitted directory (step S106). If the activation directory matches the access-permitted directory (YES at step S106), the device driver 10 accepts the access request from the C1 process 41 (step S107). The device-command processing unit 12 gains access to the S memory 123 (step S108).

Figure 7:
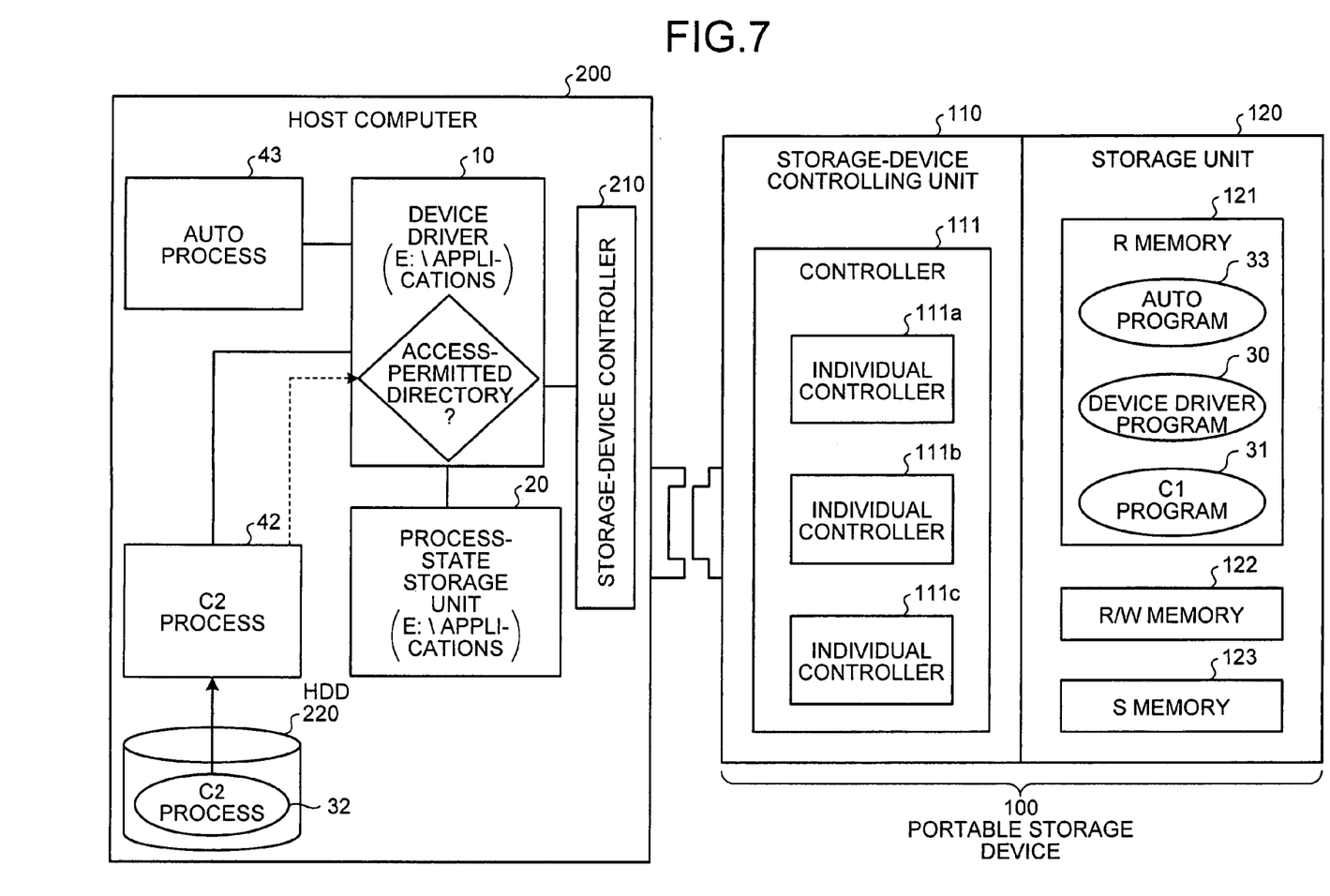
FIG. 7 is a schematic for explaining denial of access to the S memory.

FIG. 7 is a schematic for explaining denial of access to the S memory 123. As shown in FIG. 7, when The C2 process 42 is performed by the execution of the C2 program 32 stored in the HDD 220, i.e., not a computer program stored in the portable storage device 100, the C2 process 42 requests the device driver 10 for access to the S memory 123. An activation directory for the C2 process 42 does not match the access-permitted directory (NO at step S106), and the device driver 10 rejects the access request for the S memory 123 (step S109).

As described above, according to the first embodiment, the access-permitted directory storage unit 13 stores as an access-permitted directory an activation directory for a process that is allowed to access the S memory 123. The access-permission determining unit 14 checks whether an activation directory for a process that has requested for access to the S memory 123 matches the access-permitted directory. Based on the result, the access-permission determining unit 14 determines whether to accept the access request. Thus, it is possible to control and limit access to the S memory 123 so that only specific process can acquire access to the S memory 123. Namely, the device driver 10 determines whether to allow or deny access to the S memory 123 based on an activation directory for a process that has made an access request, thereby preventing unauthorized access.

The first embodiment describes access control to confidential or private information stored in a portable storage device. Similarly, it is possible to control and limit access to confidential information stored in a disk managed by a remote computer connected via a network to a host computer. The second embodiment describes the case of such remote access control via a network.

Figure 8:
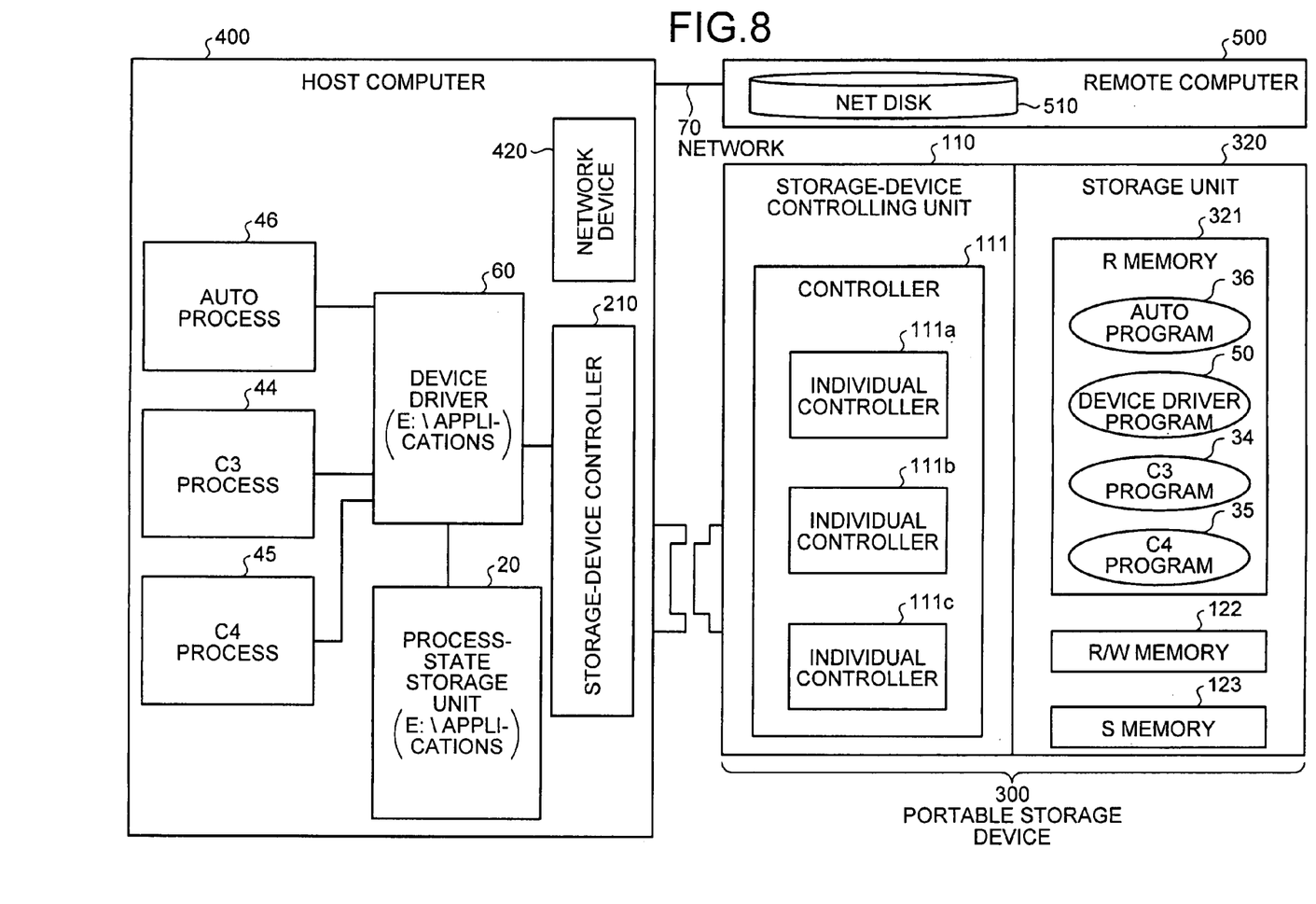
FIG. 8 is a functional block diagram of a net-disk access system according to a second embodiment of the present invention.

FIG. 8 is a functional block diagram of a net-disk access system according to a second embodiment of the present invention. Like reference characters refer to corresponding portions throughout the drawings. Any description for the previous embodiment is incorporated herein insofar as the same is applicable, and the same description is not repeated. The net-disk access system includes a portable storage device 300, a host computer 400 to which the portable storage device 300 is connected, a network 70, and a remote computer 500.

The portable storage device 300 includes a storage unit 320. The storage unit 320 includes an R memory 321 that stores therein an auto program 36, a device driver program 50, a C3 program 34, and a C4 program 35. The host computer 400 includes a network device 420. The network device 420 controls communication with another computer connected via the network 70. The host computer 400 executes a device driver 60, a C3 process 44, a C4 process 45, an auto process 46 and the like. The remote computer 500 is connected to the host computer 400 via the network 70. The remote computer 500 includes a net disk 510 that stores confidential information.

The auto program 36 is automatically invoked when the portable storage device 300 is connected to the host computer 400. When invoked, the auto program 36 is executed on the host computer 400 as the auto process 46. In the auto process 46, the device driver program 50 is loaded as the device driver 60 into the host computer 400, and the device driver 60 is informed of the drive code of the portable storage device 300. The auto process 46 also automatically invokes the C3 program 34. The device driver program 50 controls access to the portable storage device 300.

Differently from the device driver 10, the device driver 60 handles an access request for the R/W memory 122 as an access request for the net disk 510 when the host computer 400 is connected to the remote computer 500. In other words, when the host computer 400 is connected to the remote computer 500, the user of the host computer 400 has access to the net disk 510. When the host computer 400 is not connected to the remote computer 500, the user has access to the R/W memory 122.

Besides, when the host computer 400 is connected to the remote computer 500, the device driver 60 controls access to the net disk 510 based on an activation directory for a process that has requested for access to the R/W memory 122, i.e., the net disk 510. More specifically, the device driver 60 checks whether an activation directory for a process that has requested for access to the net disk 510 matches an access-permitted directory stored in the access-permitted directory storage unit 13.

The C3 program 34 is a computer program to access the net disk 510. When invoked, the C3 program 34 is executed on the host computer 400 as the C3 process 44. The C4 program 35 is an application program that requires access to the net disk 510. When invoked, the C4 program 35 is executed on the host computer 400 as the C4 process 45.

Figure 9:
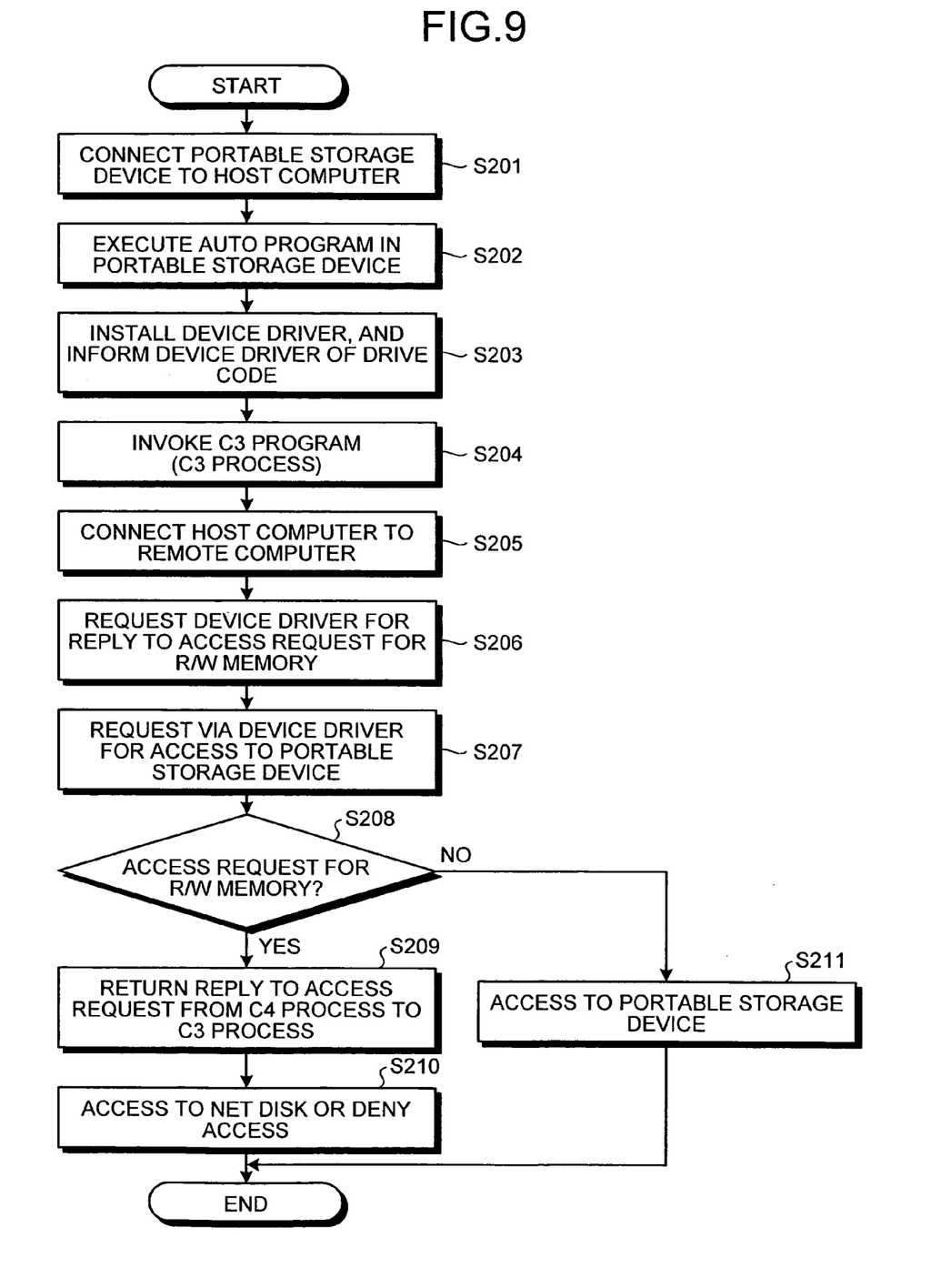
FIG. 9 is a flowchart for explaining the process of accessing a net disk shown in FIG. 8.

FIG. 9 is a flowchart for explaining the process of accessing the net disk 510. Referring to FIG. 9, when the portable storage device 300 is connected to the host computer 400 (step S201), the host computer 400 executes the auto program 36 in the portable storage device 300 (step S202). The auto process 46 reads the device driver program 50 from the portable storage device 300, and loads the device driver program 50 as the device driver 60 into the host computer 400. Then, the auto process 46 informs the device driver 60 of the drive code of the portable storage device 300 (step S203). When the auto process 46 executes the C3 program 34 (step S204), the C3 process 44 connects the host computer 400 to the remote computer 500 via the network 70 (step S205).

For example, HyperText Transfer Protocol (HTTP)/Web-based Distributed Authoring and Versioning (WebDAV) or Windows Network Basic Input/Output System (NetBIOS) can be used to access the remote computer 500. Secure Sockets Layer (SSL) can be used to provide secure WebDAV access. Besides, NetBIOS access can be secured with a protocol such as Internet protocol Security (IPSec).

When having succeeded in accessing the remote computer 500, the C3 process 44 informs the device driver 60 of the attributes (size, etc.) of the net disk 510. In addition, the C3 process 44 requests the device driver 60 for a reply to an access request for the R/W memory 122 (step S206).

Figure 10:
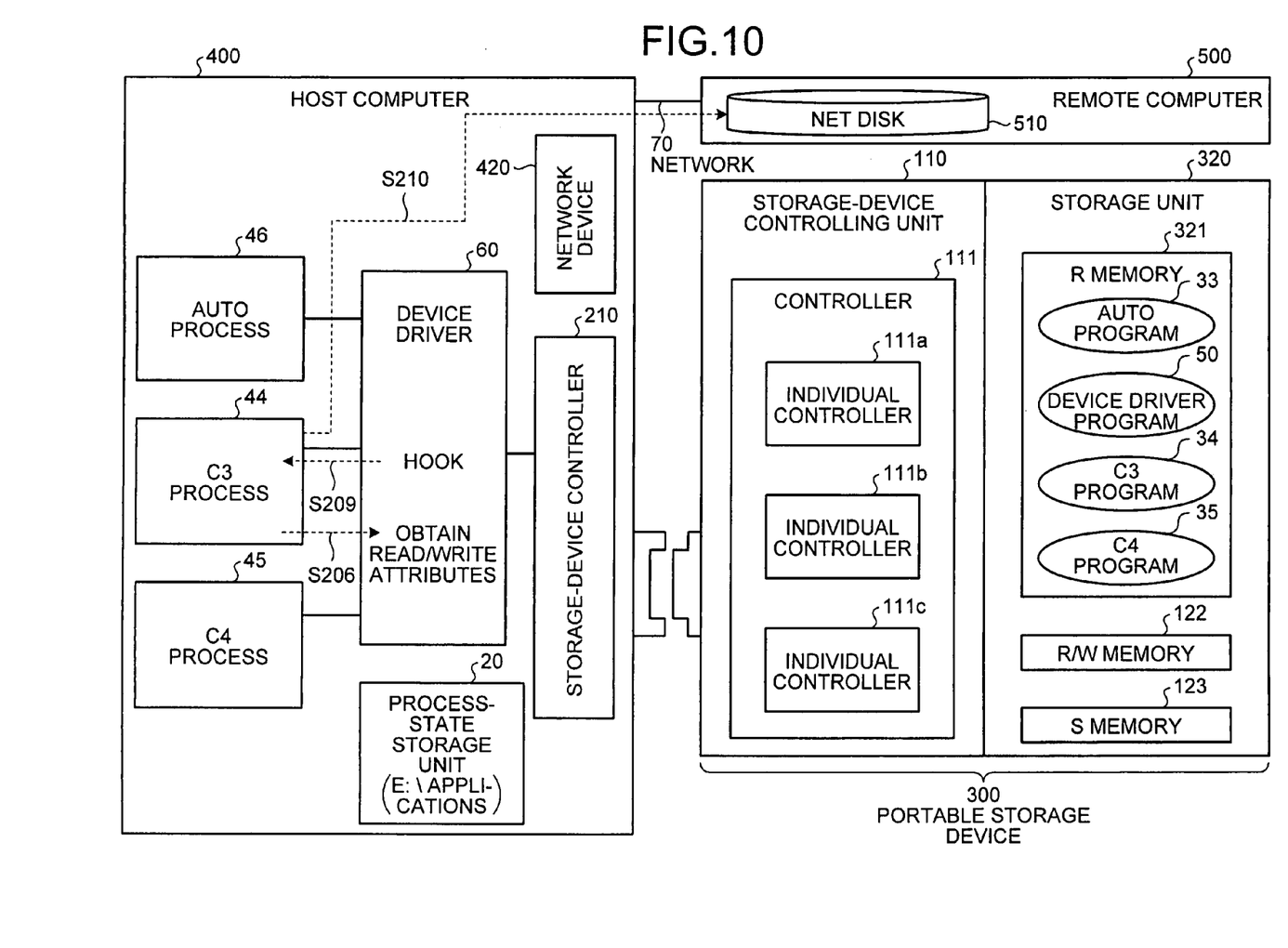
FIG. 10 is a schematic for explaining access to the net disk.

FIG. 10 is a schematic for explaining access to the net disk 510. When the C4 process 45 makes a request for access via the device driver 60 to the portable storage device 300 (step S207), the access-permission determining unit 14 of the device driver 60 determines whether access to the R/W memory 122 is requested (step S208). When access to the R/W memory 122 is requested (YES at step S208), the device driver 60 returns a reply to the access request from the C4 process 45 to the C3 process 44 as shown in FIG. 10 (step S209). In FIG. 10, a hook represents the reply from the device driver 60 to the C3 process 44.

Figure 11:
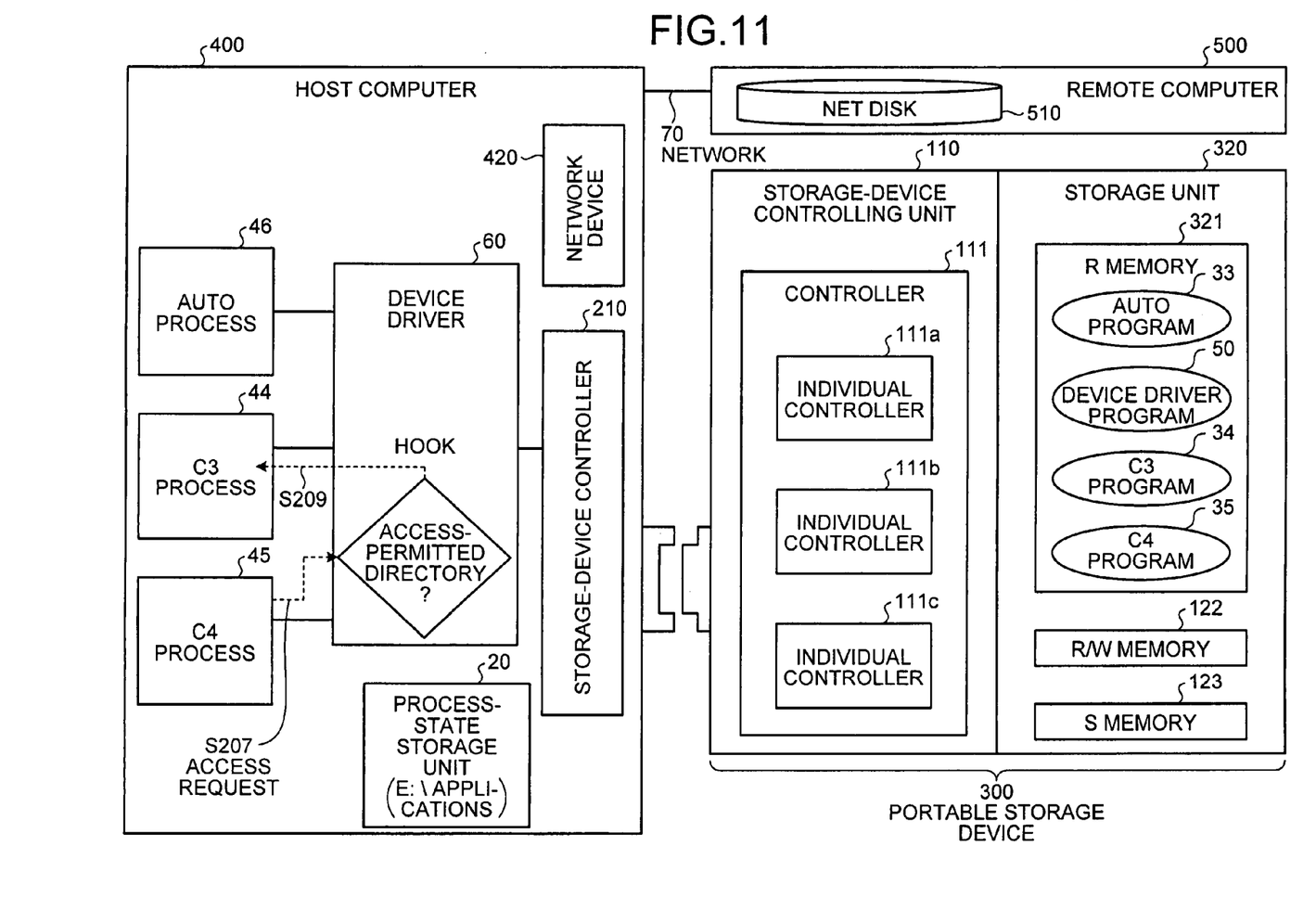
FIG. 11 is a schematic for explaining access control for the net disk.

FIG. 11 is a schematic for explaining access control for the net disk 510. As shown in FIG. 11, the access-permission determining unit 14 checks whether an activation directory for the C4 process 45 matches the access-permitted directory. If the activation directory matches the access-permitted directory, the device driver 60 instructs the C3 process 44 to accept the access request from the C4 process 45. The C3 process 44 gains access to the net disk 510 (step S210).

On the other hand, when another process than the C4 process 45 makes an access request, an activation directory for the process does not match the access-permitted directory. Accordingly, the device driver 60 instructs the C3 process 44 to reject the access request from the process. The C3 process 44 denies access to the net disk 510 (step S210). When the access-permission determining unit 14 determines that access to the R/W memory 122 is not requested (NO at step S208), the device driver 60 gains regular access to the portable storage device 300 (step S211).

As described above, according to the second embodiment, when the host computer 400 is connected-via the network 70 to the remote computer 500, the access-permission determining unit 14 of the device driver 60 converts a request for access to the R/W memory 122 from an application process into a request for access to the net disk 510. The access-permission determining unit 14 checks whether an activation directory for the application process matches an access-permitted directory. Based on the result, the access-permission determining unit 14 determines whether to accept the access request. Thus, it is possible to prevent access to the net disk 510 from an unauthorized process and leakage of confidential or private information. Namely, the device driver 60 determines whether to allow or deny access to the R/W memory 122, i.e., the net disk 510, based on an activation directory for a process that has made an access request, thereby preventing unauthorized access.

Additionally, in the case of accessing an in-house or office computer from an external computer using a virtual private network (VPN), the office computer may be infected by a virus if the external computer is infected by the virus. Even in such a case, the office computer is protected from virus infection.

Figure 12:
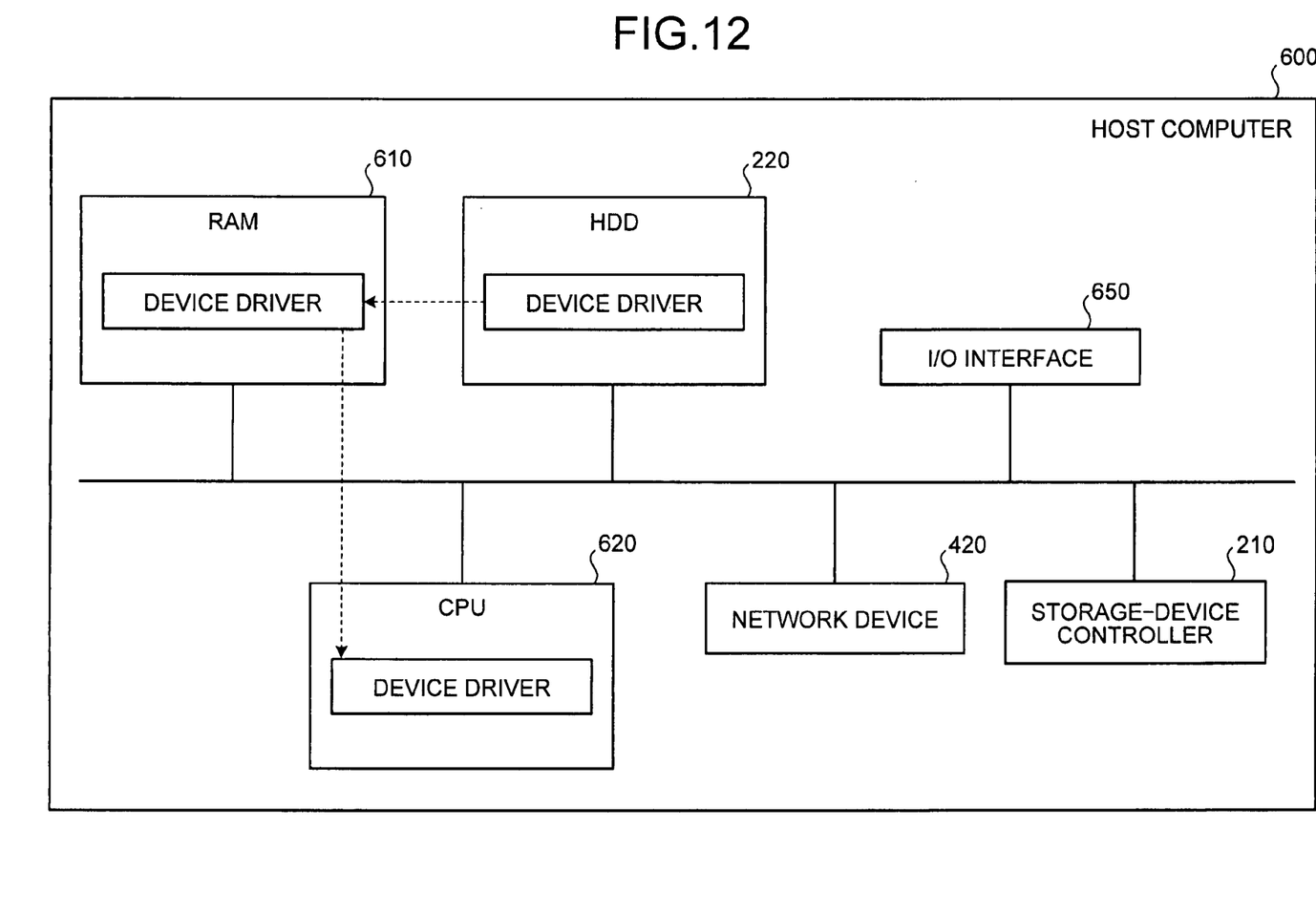
FIG. 12 is a functional block diagram of the hardware configuration of a computer that implements the methods according to the embodiments.

FIG. 12 is a functional block diagram of the hardware configuration of a host computer that executes a device driver program thereby implementing the method according to the first and second embodiments. A host computer 600 includes a random access memory (RAM) 610, a central processing unit (CPU) 620, the HDD 220, the network device 420, an input/output (I/O) interface 650, and the storage device controller 210.

The RAM 610 stores computer programs, intermediate results of the execution of the computer programs, and the like. The CPU 620 reads computer programs from the RAM 610 to execute computer programs. The HDD 220 stores various computer programs and data. The network device 420 is an interface to connect the host computer 600 to another computer (e.g., the remote computer 500) via the network 70. The I/O interface 650 is an interface to an input device, such as a mouse or a keyboard, and a display. The storage device controller 210 is an interface to a portable storage device.

The portable storage device stores therein a device driver program executed by the host computer 600. The device driver program is read from the portable storage device, and loaded as a device driver into the host computer 600 by the auto process. The device driver is stored in the HDD 220. The device driver is loaded into the RAM 610 when required, and executed by the CPU 620.

As set forth hereinabove, according to the embodiments of the present invention, only a specific process is allowed to access a storage device or medium. In other words, an access request is accepted only when made by a process activated from a storage medium that stores therein a device driver program. Thus, it is possible to prevent access from an unauthorized process in a computer. Further, the device driver program does not include a program to access a remote computer, and is compact.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A portable storage device detachably connected to a computer, having a plurality of storage areas for accessing from the computer, the portable storage device comprising:
    a program storage area that stores a computer program loaded into the computer for executing an operation of the computer;
    a device driver program being loaded into the computer for controlling an access to the portable storage device from the computer;
    an auto program being loaded into the computer for automatically loading the device driver program into the computer when the portable storage device is connected to the computer;
    a first data storage area that stores data freely accessed by the computer; and
    a second data storage area that stores private and confidential data limitedly accessed by the computer, and wherein
    the device driver program causes the computer to execute:
        determining whether an activation directory for a process that requests for an access to the second data storage area matches an access-permitted directory, the access-permitted directory being a directory where a specific loaded computer program which is permitted to access to the second storage area is stored, and
        allowing the access to the second data storage area when the activation directory matches the access-permitted directory, and
        rejecting the access to the second data storage area when the activation directory does not match the access-permitted directory, whereby only the specific loaded computer program is allowed to access to the second data storage area.

2. The portable storage device according to claim 1, wherein when the device driver program is loaded into the computer, the device driver program causes the computer to execute:
  storing a drive code of the portable storage device on an access-permitted directory storage unit in the computer, and
  allowing access to the second data storage area when the drive code matches a drive code included in the request based on a program stored in the program storage area of the portable storage device.

* * * * *